(12) United States Patent
Lin

(10) Patent No.: US 6,934,917 B2
(45) Date of Patent: Aug. 23, 2005

(54) AUTOMATIC SELECTION OF FAVORITE MEDIA SELECTIONS OF A USER OF A MEDIA PRESENTATION DEVICE

(75) Inventor: Yun-Ting Lin, Ossining, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 605 days.

(21) Appl. No.: 09/839,817

(22) Filed: Apr. 20, 2001

(65) Prior Publication Data

US 2002/0175953 A1 Nov. 28, 2002

(51) Int. Cl.⁷ .............................. G06F 3/00; G06F 9/00; G06F 17/00
(52) U.S. Cl. .................... 715/811; 725/40; 725/46; 709/224; 713/324; 348/731; 715/745
(58) Field of Search ................................. 345/811, 945, 345/860, 813; 725/40, 46; 348/331; 709/227; 713/327

(56) References Cited

U.S. PATENT DOCUMENTS

| | | | |
|---|---|---|---|
| 4,841,506 A | 6/1989 | Kiyoura et al. ............... 369/32 |
| 5,444,499 A | 8/1995 | Saitoh ......................... 348/734 |
| 5,481,256 A | 1/1996 | Darbee et al. .......... 340/825.56 |
| 5,617,571 A * | 4/1997 | Tanaka ........................ 713/324 |
| 5,801,747 A * | 9/1998 | Bedard ......................... 725/46 |
| 5,986,650 A | 11/1999 | Ellis et al. ................... 345/327 |
| 6,075,526 A | 6/2000 | Rothmuller .................. 345/327 |
| 6,078,348 A * | 6/2000 | Klosterman et al. .......... 725/40 |
| 6,192,403 B1 * | 2/2001 | Jong et al. ................... 709/224 |
| 6,519,011 B1 * | 2/2003 | Shendar ...................... 348/731 |

FOREIGN PATENT DOCUMENTS

| | | | |
|---|---|---|---|
| WO | WO9935841 | 7/1999 | ............ H04N/7/16 |
| WO | WO9935846 | 7/1999 | ............ H04N/7/16 |

OTHER PUBLICATIONS

Michael J. Hernandez, Database Design for Mere Mortals, Chapter 7, 1996.*

* cited by examiner

Primary Examiner—Steve Sax
Assistant Examiner—Boris Pesin

(57) ABSTRACT

A system and method provides for the automatic generation of a list of channels, stations, selections, etc., that are selected most often on a media presentation device by a user during a particular period of time.

4 Claims, 5 Drawing Sheets

AUTOMATIC SELECTION OF FAVORITE MEDIA SELECTIONS OF A USER OF A MEDIA PRESENTATION DEVICE

BACKGROUND OF THE INVENTION

1. Field of the Invention

This invention relates to the automatic selection of favorite media selections of a user of a media presentation device, such as a television, radio, CD player and internet browser.

2. Description of the Related Art

Most, if not all, television receivers on televisions, set top boxes, cable television boxes, video cassette recorders, etc. are sold with electronic controls that permit a viewer to move incrementally through a sequence of channels, in an ascending or descending channel number order, with "up" and "down" arrow keys on a panel on the television receiver itself or on a remote control unit that can be used to control the television receiver. Using this feature, the viewer can flip through channels and can see, for example, what shows are playing, or simply move from one channel to the next adjacent channel.

U.S. Pat. No. 5,481,256 discloses a television remote control that adds a "Scan" key which, when depressed, causes the television tuner to step through the various available channels while pausing briefly at each channel to give the viewer an opportunity to see what programs are showing. If the viewer sees something that he wishes to watch, he presses on the "scan" key again and the tuner then stops at the selected channel. The "scan" key can alternatively be set to scan through a list of channels designated by a viewer as his favorite channels.

In some existing television receivers, the viewer is able to program into the television, via an on-screen menu or a specific button, a list of the viewer's favorite channels. The viewer can then switch between the programmed favorite channels in the order in which they are arranged by depressing a "Favorite" key on the set top box or on the remote control unit. However, many viewers may not wish to go the effort of programming into the television receiver their favorite channels or may be unable to program such a feature. These same viewers may utilize the favorite channel feature if the channel selection required less or no effort.

SUMMARY OF THE INVENTION

It is therefore an object of the present invention to provide a system and method of generating a list of favorite channels automatically.

To achieve this objective, in accordance with the present invention, a system is provided for generating a list of favorite channels or media selections by determining the length of time a viewer tunes to each channel or selection, and adding to the favorite channel list a predetermined number of channels to which the viewer tunes for more than a prespecified length of time, such as, for example, more than 2 hours in one or more particular day(s), week(s), or month(s). The favorite channel list will generally comprise the channels watched by the viewer for the longest length of time during a particular time period, such as during the previous week. The viewer may also be provided with an option to manually add channels to or delete channels from the list. The system may be used for identifying favorite channels, stations, programs, etc. on a variety of receivers and media players such as, for example, channels on television, radio stations, particular music selections on a CD player, in particular a CD player with a number of CDs therein (sometimes referred to as a CD "jukebox"), and, in connection with an internet browsing program, internet web sites displaying text information, pictures and/or graphics or presenting internet media programs, such as video, music, radio stations or television channels.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
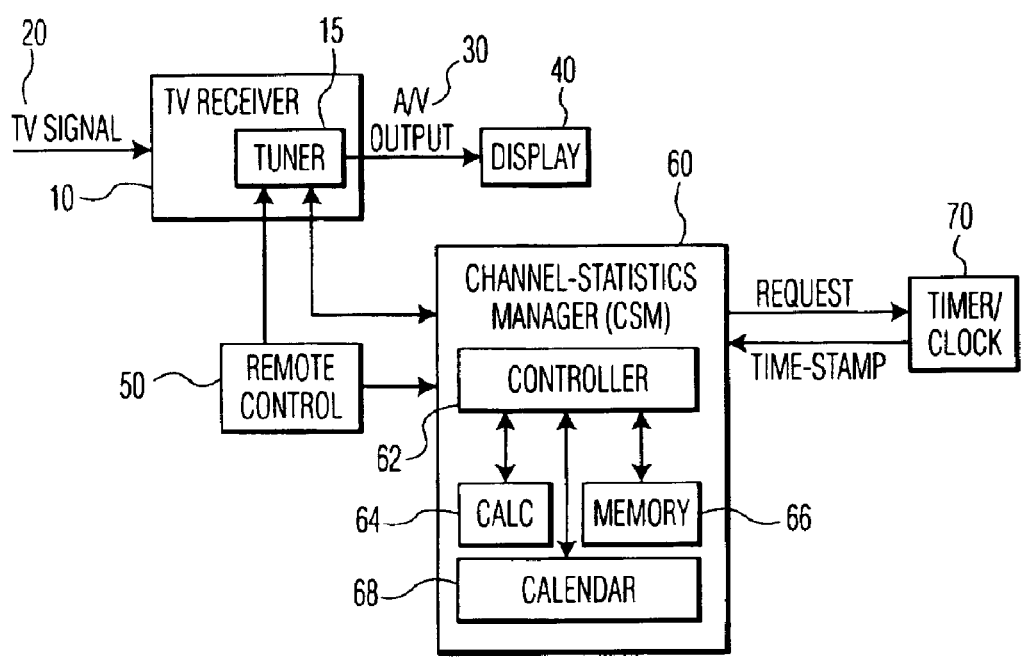
FIG. 1 is a block diagram of the components of the system and method in accordance with an embodiment of the present invention.

One embodiment of a system for implementing the present invention is shown in FIG. 1 which involves the receipt of television channels. In this system, a television receiver 10 receives a television signal 20 from a broadcast source such as over the airwaves or through a CATV signal feed. Receiver 10, which may be part of a set top box or a stand-alone device such as a cable box, has a tuner 15 that tunes the television to one of the available broadcast channels. The selection of the channel to which the receiver 10 is tuned may be made by entering a channel number, using an "up"/"down" button, or by using a "Scan" key on a remote control unit, such as the remote control unit 50 shown in FIG. 2, or on a front panel control of a television or set top box. Returning to FIG. 1, the output of tuner 15 is fed to display 40 for viewing.

A channel statistics manager (CSM) 60 tracks the length of time to which tuner 15 is tuned to each channel, and computes statistics as to which channels are the most watched. CSM 60 comprises a controller 62, a calculator 64 for calculating the time each channel is viewed, a memory 66, and a calendar 68 to provide dates. The CSM 60 may be implemented as a separate, stand-alone device, or incorporated as a unit in another device, such as receiver 10.

The CSM 60 monitors tuner 15 for channel changes and, when a viewer tunes to a particular channel or when the television receiver 10 is turned on without changing the channel, CSM 60 sends a request to a time-keeping device such as to a clock (or timer) 70 for a time stamp to be sent to CSM 60. CSM 60 records the received time stamp as the start time at which the tuner 15 was first tuned to this channel. A second request is sent from the CSM 60 to clock 70 when the channel is changed or the television is turned off requesting a time-stamp that indicates an end time for tuning to the channel. The end time-stamp is sent to CSM 60 which can then compute and store how long the television receiver 10 was set to a particular channel by subtracting the start time from the end time for the particular channel. The various computed times for which the tuner 10 was tuned to particular channels is stored in a memory 66 at CSM 60. Alternatively, clock 70 may be set to zero and turned on when a new channel is selected and may time the length of time that a channel has been selected when the television receiver is on.

Figure 2:
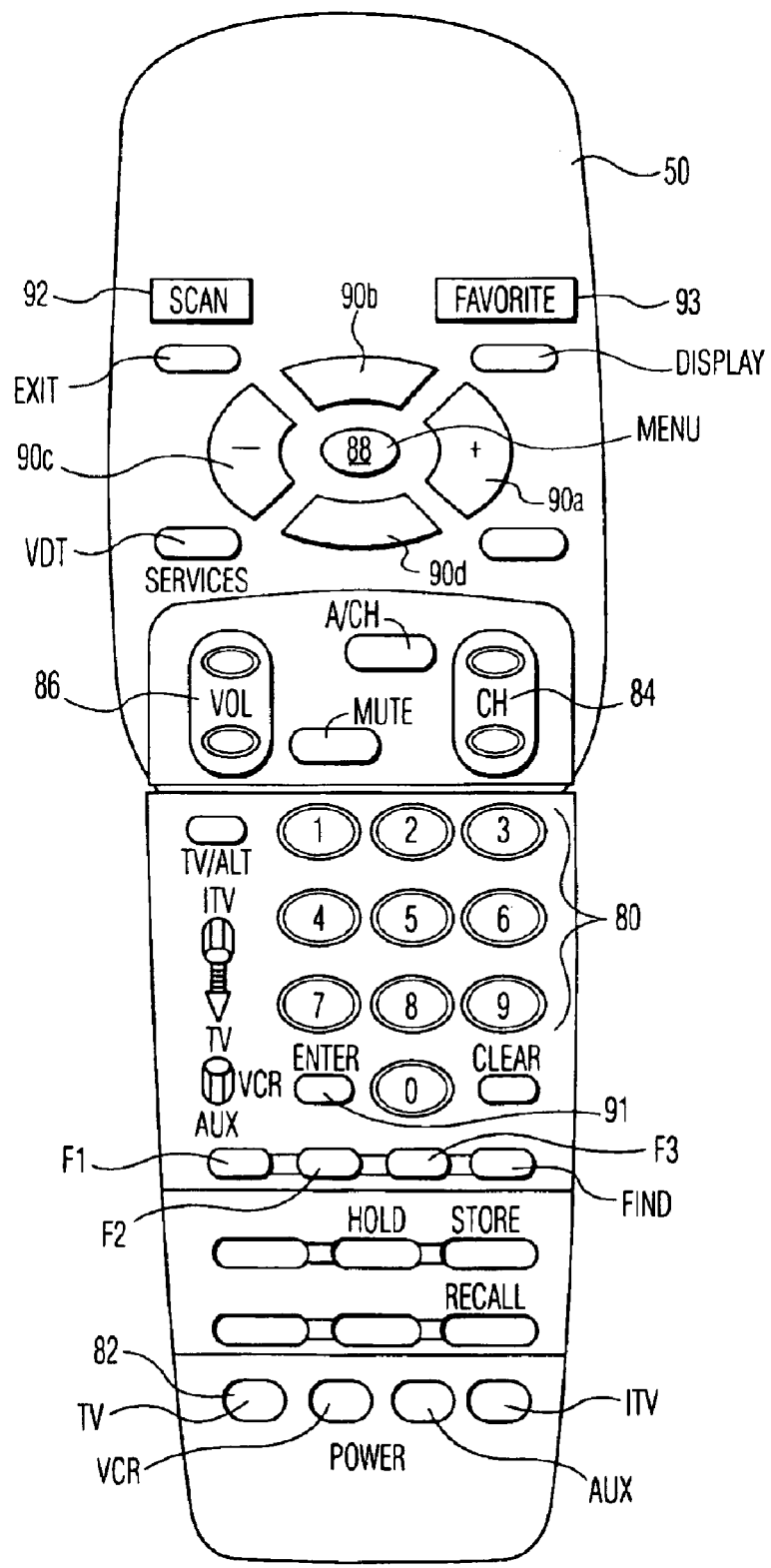
FIG. 2 depicts an example of a remote control unit for altering a favorite channel list and for scanning the channels on the favorite channel list generated in accordance with an embodiment of the present invention.

An exemplary remote control unit 50 that may be used with this invention is depicted in FIG. 2. Remote control unit 50 has a plurality of user input keys such as a set of numeric keys 80 for entering channel numbers, a power key 82 for turning the television on and off, a channel selection key 84 for sequentially changing the channels in an ascending or descending numerical order, a volume adjustment key 86, and a menu key 88 surrounded by arrow keys 90a–90d for moving within and selecting options at available menu screens that are displayed on display 40 when menu key 88 is pressed. Remote control unit 50 is supplied with a "Scan" key 92 to initiate and stop a scan of all available channels when "Scan" key 92 is pressed, and a "Favorite" key 93 that causes an on-screen menu to appear on display 40 showing a screen such as "Favorites Menu" screen 94 shown in FIG. 3 and described below. Screen 94 offers options for scanning of the favorite channels and adding or deleting channels to a favorite channel list. Some or all of these keys may be provided on the television receiver 10 in lieu of or in addition to being provided on remote control unit 50.

Figure 3:
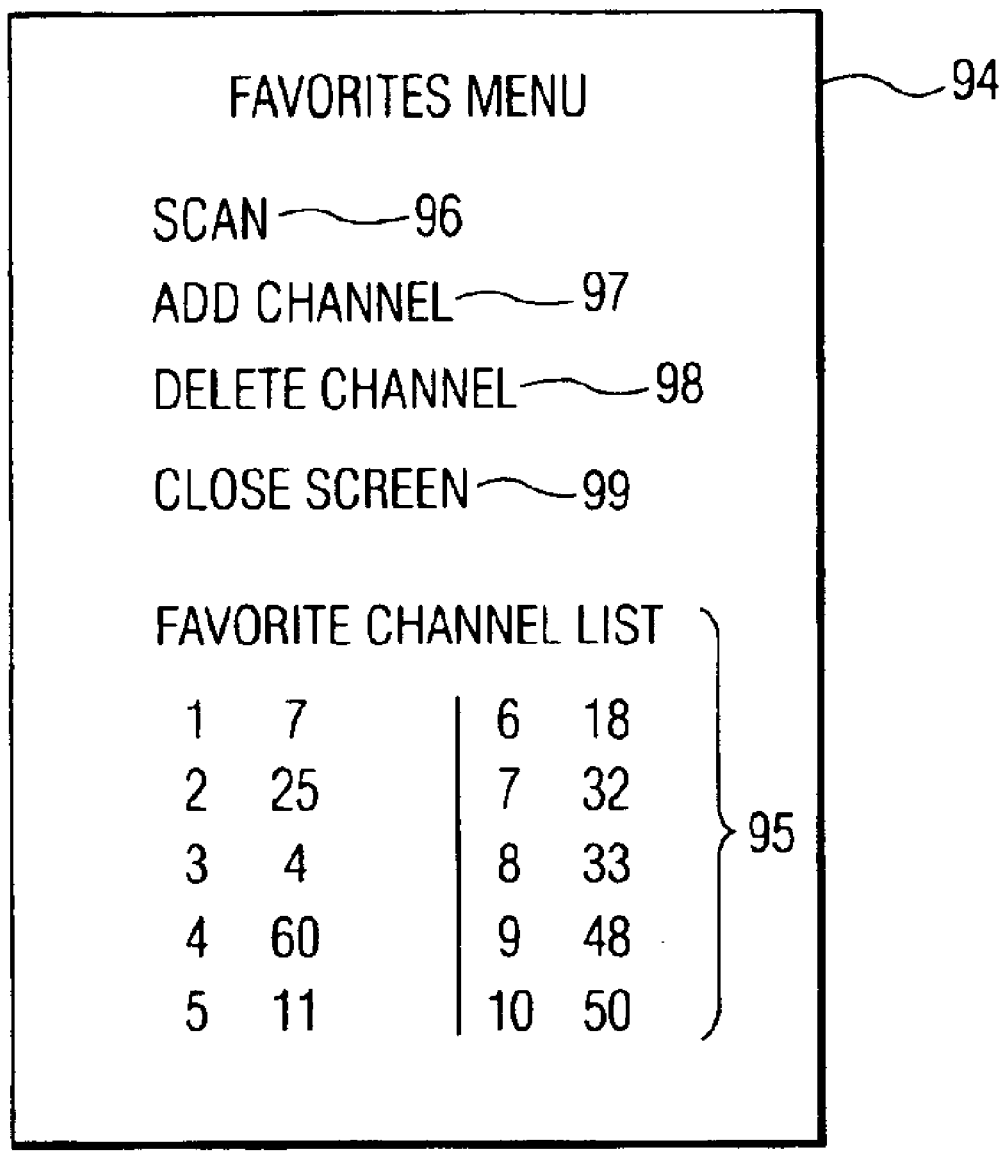
FIG. 3 depicts a sample on-screen favorites menu at which one can see a list of favorite channels, initiate a scan through favorite channels, or edit the favorite channels list.

An alternative and/or a supplement to pressing the "Scan" key 92 is to select the scan feature using an on-screen "Favorites Menu" on screen 94 shown in FIG. 3 that may be displayed on display 40 when menu key 88 is pressed. Using the arrow keys 90a–90d, the viewer scrolls to the desired selection, which in this case is the "Scan" command 96, and chooses this option, such as by pressing an "Enter" key 91. Other options available from at screen 94 are "Add Channel", "Delete Channel", and "Close Screen" which are discussed below.

Figure 4:
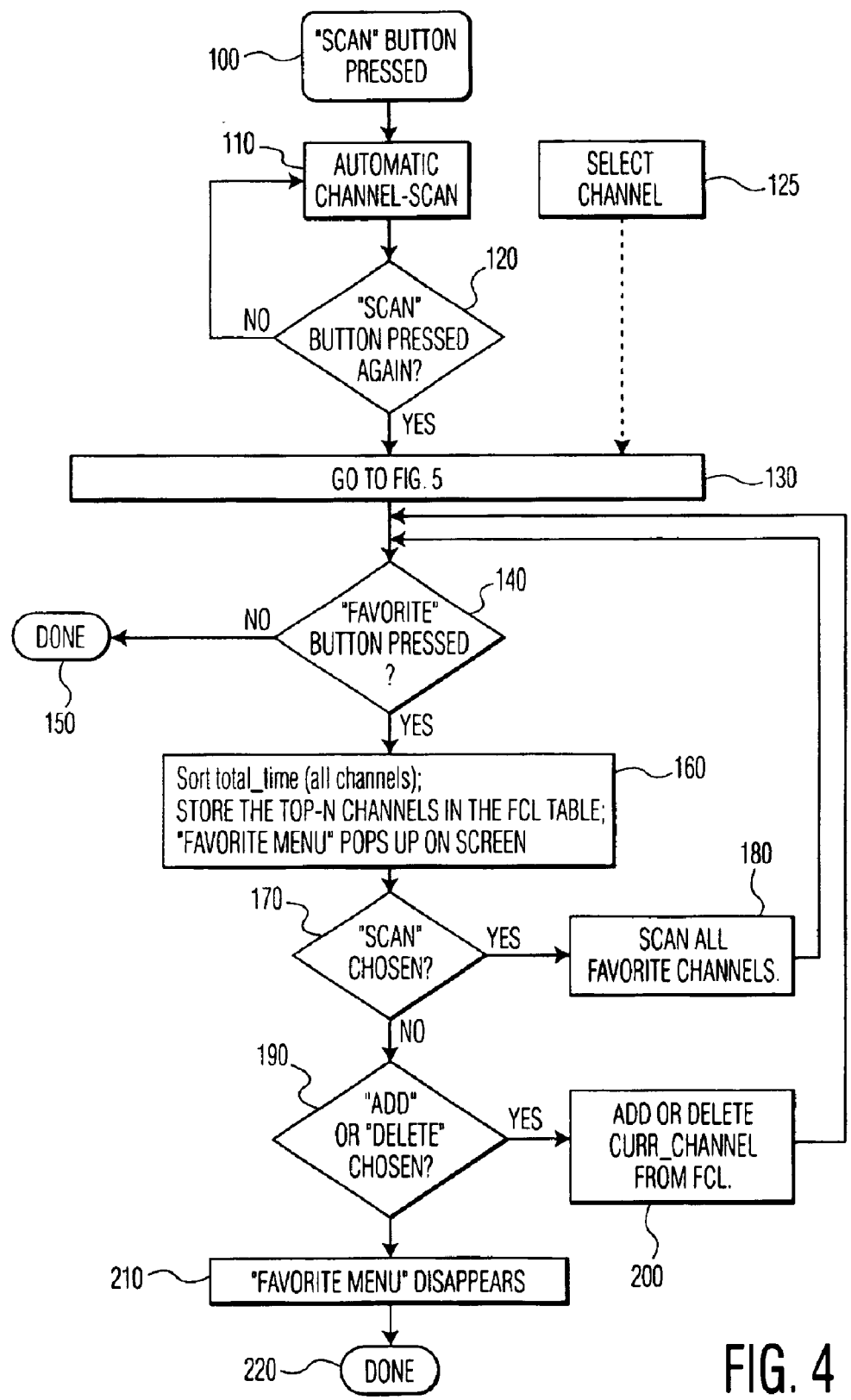
FIG. 4 is a flow chart depicting one method for generating and modifying the favorite channel list according to the present invention.

FIG. 4 is a flow chart that depicts one algorithm by which the favorite channel list may be generated and modified. At step 100, "Scan" key 92 is pressed on remote control unit 50, or on receiver 10. At step 110, an automatic channel scan begins of all available channels, thereby causing a first channel to be displayed for a specified number of seconds (which is generally preset by the manufacturer). At step 120, it is determined whether the "Scan" key 92 is pressed (or "scan" option is again selected from screen 94). If the scan feature is not activated a second time, the method returns to step 110 where the tuner 10 advances to the next available channel, usually in an ascending order. The scanning continues until the "Scan" key 92 is pressed a second time or the "scan" option is again selected at screen 94 at which point the tuner remains at the channel to which it is tuned. In lieu of performing steps 100–120, a viewer can just select a particular channel at step 125 using any channel selection means such as by using numeric keys 80.

Figure 5:
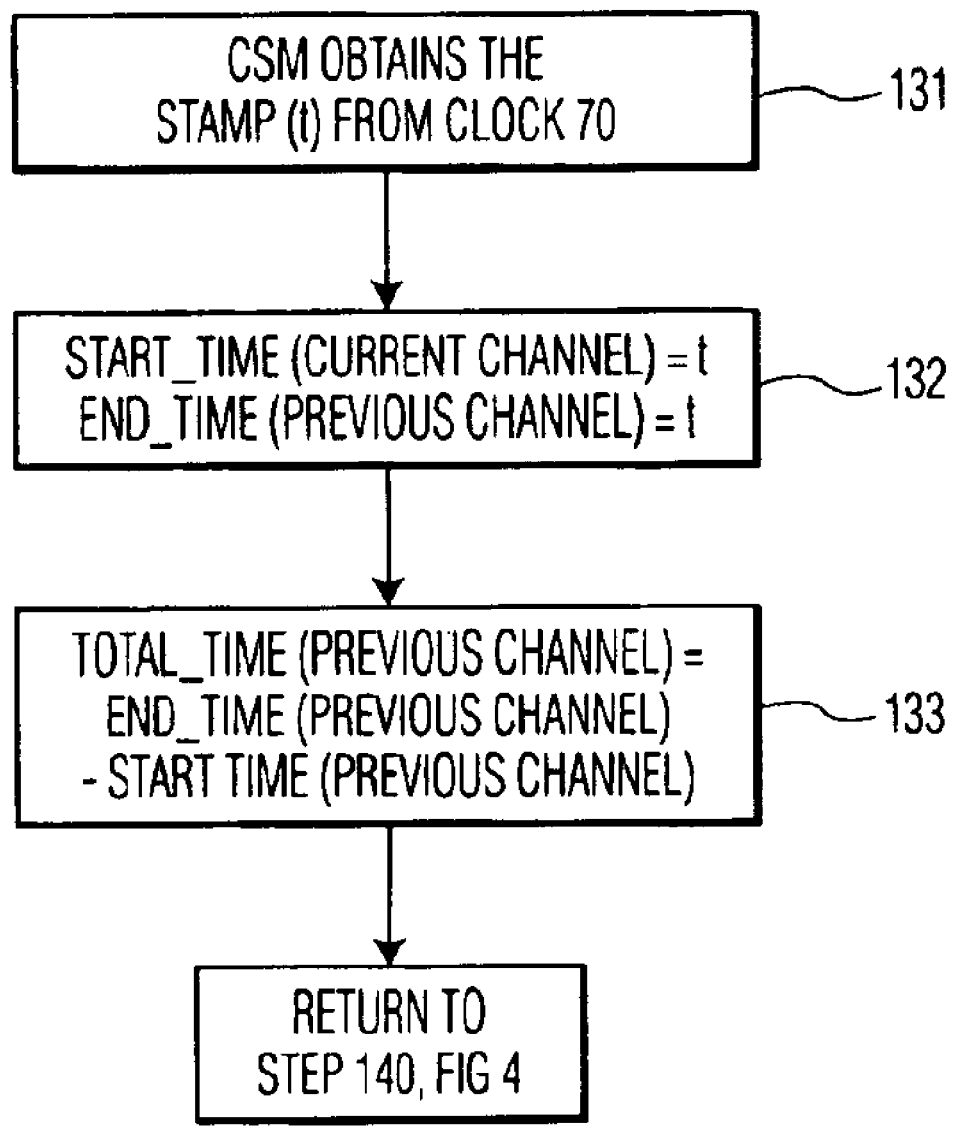
FIG. 5 is a flow chart of a sub-algorithm performed at step 130 of FIG. 4 in accordance with an embodiment of the present invention.

At step 130, the CSM 60 performs a sub-algorithm to track how long a viewer tunes to particular channels. A flow chart for this sub-algorithm is depicted in FIG. 5. At step 131 of the sub-algorithm, the CSM 60 obtains a time stamp (t) from clock 70 and records it in a table in CSM memory 66. At step 132, the start time of the current channel is set equal to "t" and the end time of the previous channel, if any, is also set to "t" at CSM 60. Although this measurement does not account for the time it takes to scan through the channels where the scan feature is used to get to the selected channel, the scan time may be assumed to be negligible (otherwise each start time and end time would have to be separately recorded). The various start and end times may be recorded in memory 66 in a table having the format of Table I.

TABLE I

| Start Time | End Time | Total Time = End Time − Start Time (step 133) | Date | Channel No. |
|---|---|---|---|---|
| 8:00 (TV On) | 8:20 | 20 minutes | Feb. 1, 2001 | 7 |
| 8:20 | 8:45 | 25 minutes | Feb. 01, 2001 | 4 |
| 8:45 | 8:59 (TV Off) | 14 minutes | Feb. 01, 2001 | 50 |
| ... | ... | ... | ... | ... |
| 20:00 (TV On) | 20:30 | 30 minutes | Feb. 7, 2001 | 4 |
| 20:30 | 22:00 | 1 hour, 30 minutes | Feb. 7, 2001 | 7 |
| 22:00 | 24:00 (TV Off) | 2 hours | Feb. 7, 2001 | 25 |
| ... | ... | ... | ... | ... |
| 18:00 | 18:50 | 50 minutes | Feb. 13, 2001 | 7 |

At step 133, the total time the tuner 10 was tuned to the previous channel is computed at CSM 60 as the time-stamped end time (t) minus the time-stamped start time recorded for tuning to the previous channel and is stored in memory 66 at CSM 60. The date of the channel viewing may also be recorded in Table I. Table I contains entries for a period of time that is of interest (e.g. previous 2 weeks, previous 10 hours, etc.). Earlier entries can be deleted once they are no longer within this time period of interest.

The information stored Table I can be periodically referenced to generate and update a Table II, wherein the information in Table I can be consolidated to calculate the total viewing times of each channel for the period of interest. Once the times entered for a particular viewing interval in Table I are reflected in Table II, those entries can be deleted from Table I.

TABLE II

| Channel | Total Viewing Time During Period of Interest |
|---|---|
| 1 | 0 |
| 2 | 0 |
| 3 | 0 |
| 4 | 55 minutes |
| 5 | 0 |
| 6 | 0 |
| 7 | 2 hours, 40 minutes |
| ... | ... |
| 25 | 2 hours |
| ... | ... |
| 50 | 14 minutes |

Returning to FIG. 4, at step 140, if the "Favorite" key 93 is not pressed at any point before the television set is turned off, the algorithm ends at step 150. If the "Favorite" key 93 is pressed, the algorithm proceeds to step 160, where the total times for each of the channels viewed and stored at Table II at CSM 60 is sorted at CSM 60 to automatically generate a favorite channel list (FCL) table listing the N most watched channels during a particular time period based on how long tuner 15 has been tuned to the various channels during the time period of interest. For example, N may be the top 10 channels a viewer watched most during the past 2 weeks, where 2 weeks is the period of interest. The maximum number N that may be stored is generally preset by the manufacturer of CSM 60 or a television set incorporating a CSM 60. The FCL table is stored at CSM 60. The favorite channels may appear in the table is any order, such as the most watched channels first. The point at which the favorite channel list 95 is generated is a matter of design choice. The favorite channel list 95 may be generated, for example, at step 130 before the "Favorite" key 93 is pressed, instead of at step 160, but this would unnecessarily consume resources because the channels on favorite channel list 95 are subject to change at any time before the "Favorite" key 93 is pressed.

Once the FCL table is created, a "Favorites Menu", such as the screen 94 shown in FIG. 3, pops up on the display 40. Screen 94 shows the favorite channel list 95, and offers the options of selecting any of the "Scan" command 96, "Add channel" command 97, "Delete channel" command 98, and "Close Screen" command 99. For example, in the favorite channel list 95 of FIG. 3, channel 7 is the most watched channel, followed by channel 25, etc.

The viewer may navigate through the favorite channel list 95 by choosing the "Scan" command 96 at step 170 to commence the scanning of all favorite channels on the favorite channel list 95 at step 180. Thus, in the example shown in FIG. 3, channel 7 would be displayed first for a period of time (e.g. 3 seconds), then channel 25 would be displayed for a similar period of time, etc., through channel 50 at which point the tuner 15 loops back to the beginning of the favorite channel list 95 to play the first channel (channel 7) on list 95. To stop the scan and remain at the currently displayed channel on display 40, one presses the "Favorite" key 93 again and screen 94 then closes.

Instead of choosing the "Scan" command 96 at step 170, either of the Add Channel or Delete Channel commands 97, 98 may be chosen at step 190, thereby permitting the user to edit the favorite channel list 95. Choosing the Delete Channel command 98 at step 190 causes a cursor to be placed at the favorite channel list 95 and the cursor can be manipulated, such as with "up" and "down" arrow keys, to the list item that indicates the channel to be omitted. At step 200, the channel to be omitted can then be selected using the "Enter" key 91 and screen 94 then closes. Another channel can be selected for omission by pressing the "Favorite" key 93 again at step 140. After the particular channel is deleted, a replacement channel other than the one deleted, if any, is added to the favorite channel list 95. The newly added channels may either take the place of the deleted channel on list 95 or, if the deleted channel was not the last channel on list 95, the remaining channels on list 95 may move up on the list and the replacement channel added to the bottom of list 95. If the Add Channel command 97 is chosen at step 190, the viewer may enter, at step 200, the channel to be added such as by using the set of numeric keys 80 or with channel selection key 84 on remote control unit 50. Adding a channel will cause the least watched channel (i.e. the channel on favorite channel list that was tuned to the least) to be dropped from the favorite channel list 95 and screen 94 will close. The algorithm ends at step 220.

The system and method may also be designed so that a favorite channel is added to the favorite channels list only if the channel has been viewed or selected more than a threshold total or accumulated viewing time over predetermined longer sampling period. Thus, for example, a channel would be added to the favorite channel list only if it was viewed or selected for more than a total of 10 hours over the period of one week. In this example, if a channel was viewed for an accumulated total of 8 hours over the one week sampling period, it would not be added to the favorite channel list because the 8 hours did not exceed the threshold of 10 hours, but if a channel was viewed for an accumulated total of 30 hours over the week, the channel would be added to the favorite channels list because the threshold was surpassed over the sampling period. It is contemplated that the threshold accumulated viewing or selection period and the sampling period can be preset by the manufacturer and/or adjusted or set by the user.

The system and method of the invention can also be used in conjunction entertainment systems and media presentation devices other than televisions, such as radio receivers. A favorites list can be prepared for these radio receivers by timing the length of time to which a user tunes to a particular radio station. The system and method of the invention can also be used to identify favorite music selections selected by a user of a CD player with a CD having numerous music selections, songs, etc. In particular, the invention is applicable to a CD player that has a small number of CDs therein, typically five CDSs, or a CD player than holds a plurality of CDs, sometimes referred to as a CD "jukebox" player that may hold 20 or more CDs. The invention may be used so that only favorite music selections are played, or so that favorite music selections are played more often than other music selections when the CD player is playing music selections from the CD or CDs in "random play" mode, that is when the CD player "randomly" selects which music selection to play, rather than playing the music selections in the sequential order in which they appear on the CD. The system may also be used in connection with a computer (including a non-portable and a portable device, and a hand-held device or computer such as a personal digital assistant, or a mobile telephone) and an internet browsing program to automatically identify internet websites or web pages of particular interest to the user. These favorite websites can be added to the list of "bookmarks" or "favorites" in the internet web browsing program or added to a list of favorite channels in internet plug-in programs that deliver and display internet media programs such as streaming live or prerecorded video, live radio stations, live television stations, live or prerecorded music, etc.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed is:

1. A method of automatically generating a list of favorite media selections of a user of a media presentation device offering a plurality of media selections, comprising:

recording for each of a plurality of selections a total time that each of the plurality of selections have been selected on the media presentation device over a particular period of interest, wherein recording includes:
  (i) for each occurrence of selecting one of the plurality of selections over the particular period of interest, (a) recording in a first table entries of a start time, an end time, a date, and a corresponding selection identification number, wherein a total time per occurrence corresponds to a difference between the end time and the start time, and (b) deleting from the first table entries that no longer occur within the particular period of interest, and
  (ii) responsive to one of more of a user activation of a favorite list key or a user selection of a favorite list feature of an on-screen menu, referencing the first table to perform at least one of generating and updating a second table, wherein the at least one of generating and updating the second table includes (a) using entries of the first table per selection to calculate a cumulative total time for each of the plurality of selections that have been selected over the particular period of interest and (b) recording each cumulative total time for corresponding selections as entries of the second table; and further responsive to one or more of the user selection of the favorite list key or the user selection of the favorite list feature of the on-screen menu, sorting and generating from the entries of the second table a favorite selection list, wherein sorting and generating the favorite selection list comprises sorting and generating up to N selections of the plurality of selections corresponding to those most frequently selected as determined from (a) the recorded cumulative total time that each of the plurality of selections has been selected over the particular period of interest and (b) only if the recorded cumulative total time of a corresponding selection during a sampling period within the period of interest exceeds a threshold, wherein the sampling period comprises a sampling period preset by a manufacturer of the media presentation device or set by an end user of the media presentation device, further wherein N is a predetermined number of selections to be included on the favorite selection list.

2. The method of claim 1, wherein the threshold is on the order of greater than 10 hours over a one week sampling period within the particular period of interest.

3. A system for automatically generating a list of favorite selections for a user of a media presentation device having a plurality of selections, the system comprising:

a time-keeping device for use in tracking a total time that each of a plurality of available media selections have been selected on the media presentation device over a particular period of interest, wherein tracking includes:
  (i) for each occurrence of selecting one of the plurality of selections over the particular period of interest, (a) tracking in a first table entries of a start time, an end time, a date, and a corresponding selection identification number, wherein a total time per occurrence corresponds to a difference between the end time and the start time, and (b) deleting from the first table entries that no longer occur within the particular period of interest, and
  (ii) responsive to one of more of a user activation of a favorite list key or a user selection of a favorite list feature of an on-screen menu, referencing the first table to perform at least one of generating and updating a second table, wherein the at least one of generating and updating the second table includes (a) using entries of the first table per selection to calculate a cumulative total time for each of the plurality of selections that have been selected over the particular period of interest and (b) tracking each cumulative total time for corresponding selections as entries of the second table; and a selection statistics manager coupled to the time-keeping device and also responsive to one or more of the user activation of the favorite list key or the user selection of the favorite list feature of the on-screen menu for generating from the entries of the second table a favorite selection list, wherein generating the favorite selection list comprises sorting entries of the second table and generating up to N selections of the plurality of selections corresponding to those most frequently selected based on (a) the cumulative total time the media presentation device has selected each of the plurality of selections over the particular period of interest and (b) only if the tracked cumulative total time of a corresponding selection during a sampling period within the period of interest exceeds a threshold, wherein the sampling period comprises a sampling period preset by a manufacturer of the media presentation device or set by an end user of the media presentation device, further wherein N is a predetermined number of selections to be included on the favorite selection list.

4. The system of claim 3, wherein the threshold is on the order of greater than 10 hours over a one week sampling period within the particular period of interest.

* * * * *